Aug. 25, 1936.  P. F. SHIVERS  2,052,536
MODULATING CONTROL
Original Filed Nov. 1, 1930    4 Sheets-Sheet 1

INVENTOR.
Paul F. Shivers,
BY
Hood + Hahn.
ATTORNEYS

Aug. 25, 1936.   P. F. SHIVERS   2,052,536
MODULATING CONTROL
Original Filed Nov. 1, 1930   4 Sheets-Sheet 2

INVENTOR.
Paul F. Shivers,
BY
Hood + Hahn.
ATTORNEYS

Aug. 25, 1936.          P. F. SHIVERS                2,052,536
                        MODULATING CONTROL
            Original Filed Nov. 1, 1930    4 Sheets-Sheet 3

INVENTOR.
Paul F. Shivers,
BY
Hood & Hahn.
ATTORNEYS

Aug. 25, 1936.　　　　P. F. SHIVERS　　　　2,052,536
MODULATING CONTROL
Original Filed Nov. 1, 1930　　4 Sheets-Sheet 4

INVENTOR.
Paul F. Shivers,
BY
Hood + Hahn.
ATTORNEYS

Patented Aug. 25, 1936

2,052,536

UNITED STATES PATENT OFFICE 2,052,536

MODULATING CONTROL

Paul F. Shivers, Wabash, Ind., assignor to Minneapolis-Honeywell Regulator Company, Minneapolis, Minn., a corporation of Delaware Application November 1, 1930, Serial No. 492,741
Renewed October 13, 1933

29 Claims. (Cl. 236—68)

The object of my present invention is to provide thermostatic mechanism wherein a power delivery element may be caused to assume and maintain a definite position desired by reason of the temperature at a given point. More specifically, the object of the invention contemplates the utilization of the power delivery element for positioning a flow-controlling element, which, in some instances will affect the action of thermostatic mechanisms in accordance with temperatures acquired as a result of controlled flow.

The invention, as broadly stated above, may be embodied in various specific forms and therefore, more specifically, the object of my invention is to provide an apparatus:

(a) In which the rate of delivery of a heating medium to a compartment may be varied inversely as the temperature of the compartment falls below a desired minimum.

(b) In which the rate of flow of a fluid through a valve structure may be varied in accordance with the variation, from a desired maximum or minimum, of the temperature at a predetermined point.

(c) In which the rates of flow of a plurality of fluids may be concurrently varied proportionately as a result of the variation, from a desired maximum or minimum, of the temperature at a predetermined point.

The accompanying drawings illustrate, diagrammatically, embodiments of my invention.

Figure 1:
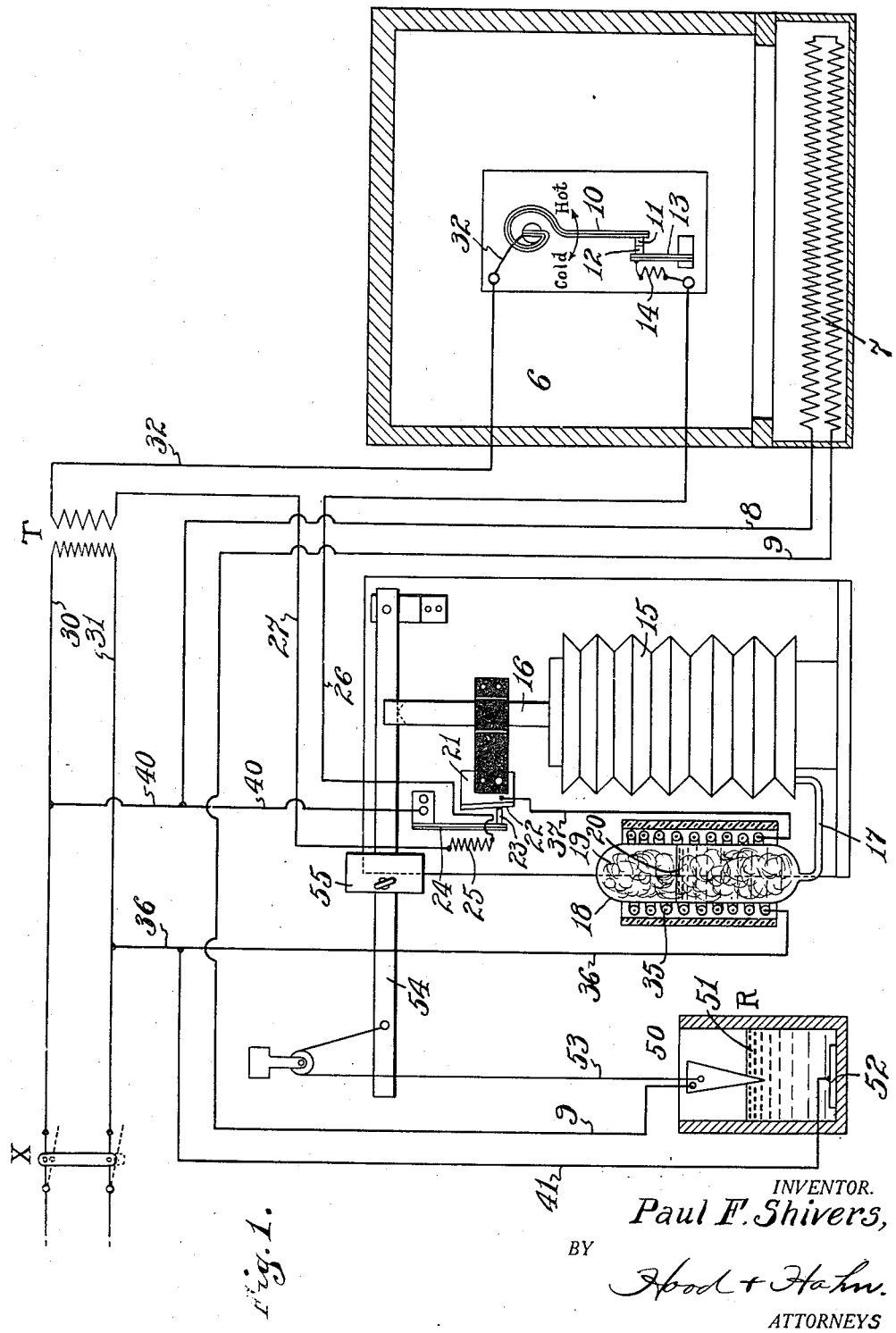
Fig. 1 is a diagram of apparatus capable of controlling the rate of flow of an electric current to a heating element in accordance with the temperature needs of an isolated compartment.

Referring first to Fig. 1, 6 indicates a compartment to be heated to a desired temperature, in which is arranged an electrical heating element 7, supplied with current through the wires 8 and 9. Mounted in chamber 6 is a bi-metallic thermostatic blade 10 sensitively responsive to variations in temperature within chamber 6, said blade carrying a contact terminal 11 and being most conveniently electrically conductive. Arranged to be contacted with terminal 11 is a terminal 12 carried by a bi-metallic thermostatic blade 13 which is most conveniently not as sensitively responsive to variations in desired temperature of chamber 6 as is blade 10. The two blades 10 and 13 are arranged so as to be temperature-responsive in opposite directions and associated with blade 13 is an electrical heating element 14.

At a point remote from chamber 6 is a motor element 15 which, in the present instance, is illustrated as an expansible and contractible bellows capable of actuating the power-delivery element 16. Communicating with the interior of bellows 15 through a pipe 17 is the interior of a metal capsule 18 preferably packed with copper wool 19, said bellows, tube and capsule containing a volume of volatile liquid 20 sufficient to fill the same when the bellows is collapsed to its limit.

Carried by element 16, but electrically insulated therefrom is an electrical terminal 21 having a face 22 inclined slightly from the line of movement of plunger 16, as shown in the drawings.

A terminal 23, carried by a bimetallic thermostatic blade 24, is so arranged that terminal 23 is just out of contact with terminal 21 when the bellows 15 is fully collapsed and so that heating of blade 24 will carry terminal 23 into contact with terminal 21, whereupon heating of capsule 18 will cause terminal 21 to be elevated to break the contact between terminal 23 and terminal 21.

Associated with blade 24 is an electrical heating element 25, one end of which is connected by wire 26 with one end of coil 14 and the other end of which is connected by wire 27 with one end of the secondary of a transformer T, the primary of which is connected to the line wires 30 and 31. The other end of the secondary of transformer T is connected by wire 32 with blade 10, and consequently with terminal 11. One end of heating element 14 is connected to terminal 12 either directly or through blade 13.

An electrical heating element 35 is associated with capsule 18, one end of this element being connected by wire 36 with line wire 31 and the other end thereof being connected by wire 37 with terminal 21. A wire 40 connects blade 24, and hence terminal 23, with line wire 30 and wire 8 is connected to wire 40.

Delivery of current through element 7 is controlled by a rheostat R which is preferably of a modulating type i. e., one in which current variation is by infinitesimal steps. Wire 9 is connected to one end of this rheostat and a wire 41 connects the other end of this rheostat to line wire 31, conveniently by connection with wire 36.

Rheostat R may be of any desired effective type and I have illustrated diagrammatically a type wherein the movable terminal 50, to which wire 9 is connected, is an iron wedge, of varying cross-section, depending in a saline solution 51 submerging a copper terminal 52 to which wire 41 is connected.

For the purpose of varying the effectiveness of rheostat R, the terminal 50 is suspended by a cord 53 attached to a lever 54 actuated by plunger 16, said lever 54 carrying a suitable counter-weight 55 for purposes of calibration and adjustment.

A switch X may be provided in the line 30, 31.

The operation is as follows:

At temperatures below the desired temperature within chamber 6, blade 10 causes terminal 11 to contact with terminal 12, and thus closes the circuit T, 32, 10, 11, 12, 14, 26, 25, 27, T, whereupon element 14 will be heated causing terminal 12 to move away from terminal 11 and element 25 will be heated causing terminal 23 to move into contact with terminal 21, whereupon the circuit 31, 36, 35, 37, 21, 23, 24, 40, 30 will be closed, the element 35 will be heated, and the liquid 20 will be volatilized to an extent sufficient to cause bellows 15 to expand until terminal 21 separates from terminal 23.

Blade 10 will have been adjusted, conveniently by means of a common adjustable mounting for its anchored end, so that terminal 11 will just contact with terminal 12 when the temperature of the interior of chamber 6 is at the desired maximum.

The heating of elements 14 and 25 will continue until terminal 12 is retracted from terminal 11. When the bellows is in its collapsed position terminal 50 is in position to permit minimum current flow to element 7.

When the circuit of elements 35 and 25 is broken by retraction of terminal 12 from terminal 11, blade 13 will cool and move terminal 12 back toward terminal 11 and blade 24 will cool so as to move terminal 23 away from terminal 21.

Upon lapse of a comparatively short time, so long as blade 10 is at a temperature below the desired maximum of temperature in chamber 6, terminal 12 will again contact with terminal 11 and again elements 14 and 25 will be heated and the cycle already described will be repeated.

So long as blade 10 is in any position below the position which it will attain when at the desired maximum temperature, blade 13 will vibrate to intermittently contact terminal 12 with terminal 11 and, bellows 15 being expanded, terminal 50 will permit a flow of current to element 7 proportionate to the degree of departure of the temperature in chamber 6 below the desired maximum.

The intermittent contacting between terminals 11 and 12 will occur at comparatively short intervals, and the consequent intermittent heating of the element 25 will cause the blade 24 to assume, and retain within a very limited range of variation, a position which will be a function of the contemporaneous position of the blade 10.

Each time terminal 23 contacts with terminal 21 the heating element 35 will be energized and each time terminal 23 separates from terminal 21 the circuit of the heating element 35 will be broken. There will consequently be volatilization of the liquid 20 at short intervals and corresponding slight fluctuation of the position of element 16. The separation between terminals 23 and 21 will be a result of the coordinated movements of those terminals, one under the influence of the heating element 25 and the other under the influence of the bellows 15, and as a consequence the bellows 15, i. e., the power-delivery element of the combination, will assume, and tend to retain, a certain definite position which will also be a function of the contemporaneous position of blade 10 and the position of bellows 15 will determine the relation of terminal 50 to the conductive solution 51 to determine the rate of flow of current to the heater element 7, in accordance with the heat needs of chamber 6 as indicated by the contemporaneous position of blade 10.

Figure 2:
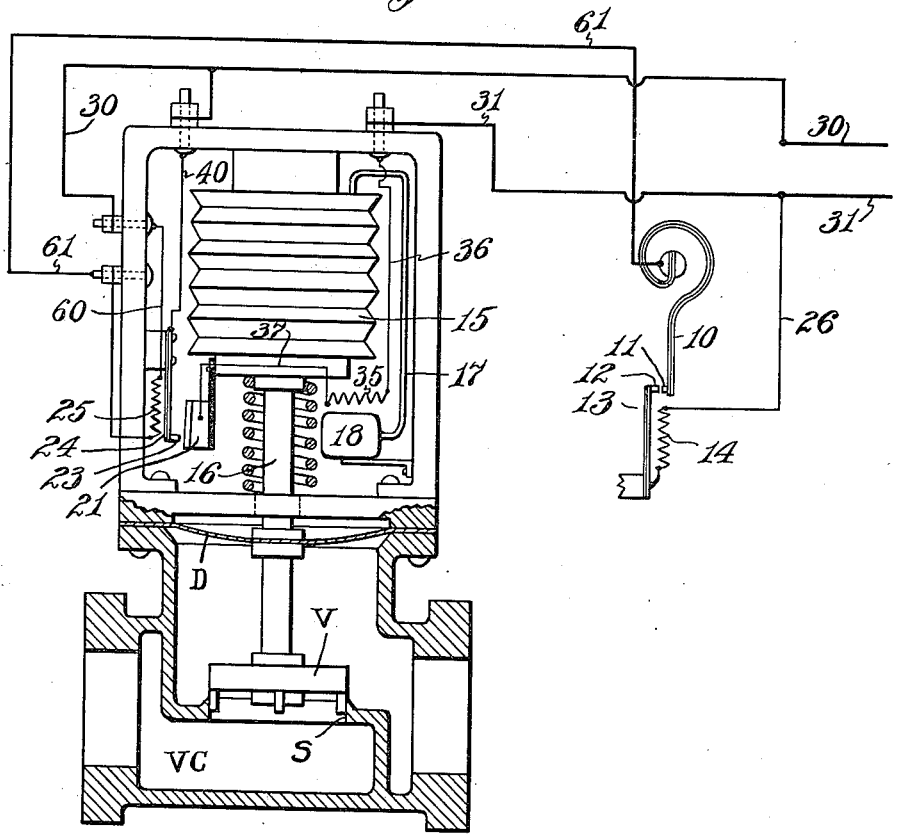
Fig. 2 is a diagram of a valve mechanism capable of modulating the rate of flow of a fluid therethrough in accordance with the temperature conditions at a remote point.

In the diagram Fig. 2, parts which correspond in structure and function with similar parts in Fig. 1 are similarly designated. This device is a modulating valve capable of controlling the rate of flow of a fluid, the valve structure performing a function analogous to the function performed by the rheostat R in the arrangement shown in Fig. 1. The bimetallic thermostatic blade 10 carries terminal 11 and is arranged in a location the temperature of which is to be the determining factor in accordance with which the flow rate is to be determined. Coacting with terminal 11 is the terminal 12 carried by the bimetallic thermostatic blade 13 coordinated with the heater element 14. The element 16 of the bellows 15 is the actuating stem of a valve V coacting with the seat S of the valve casing VC, element 16 being coordinated with a suitable fluid-tight packing, as for instance the sealing diaphragm D. The bellows-actuated terminal 21 coacts with terminal 23 carried by bimetallic blade 24 which may be heated by element 25 one end of which is connected by wire 60 to line 30 and the other end of which is connected by wire 61 with terminal 11 through blade 10. The blade 24 is connected by wire 40 with line 30.

Bellows 15 communicates through pipe 17 with capsule 18, which capsule is heated by coil 35, one end of which is connected by wire 37 with terminal 21 and the other end of which is connected by wire 36 with line 31.

The cooperation of the parts is substantially the same as in the arrangement shown in Fig. 1. In this instance the power-delivery element 16, is definitely positioned in accordance with the contemporaneous position assumed by blade 10, and this serves to position valve V relative to the seat S to control the rate of flow through the valve casing VC in accordance with the contemporaneous temperature position of the blade 10.

In this connection it should be understood that in this apparatus the power-delivery element is not rapidly shifted from maximum to minimum position when electrical contacts are broken at 11—12 or 21—23 but, instead, is modulated from one position to another throughout its range in accordance with the contemporaneous position which the temperature-responsive blade 10 assumes, or tends to assume, due to the temperature of the ambient medium.

As a consequence the accuracy of flow control is very much greater than can be attained by a structure in which the flow-controlling valve is intermittently closed to stop all flow and opened to permit maximum flow.

Figure 3:
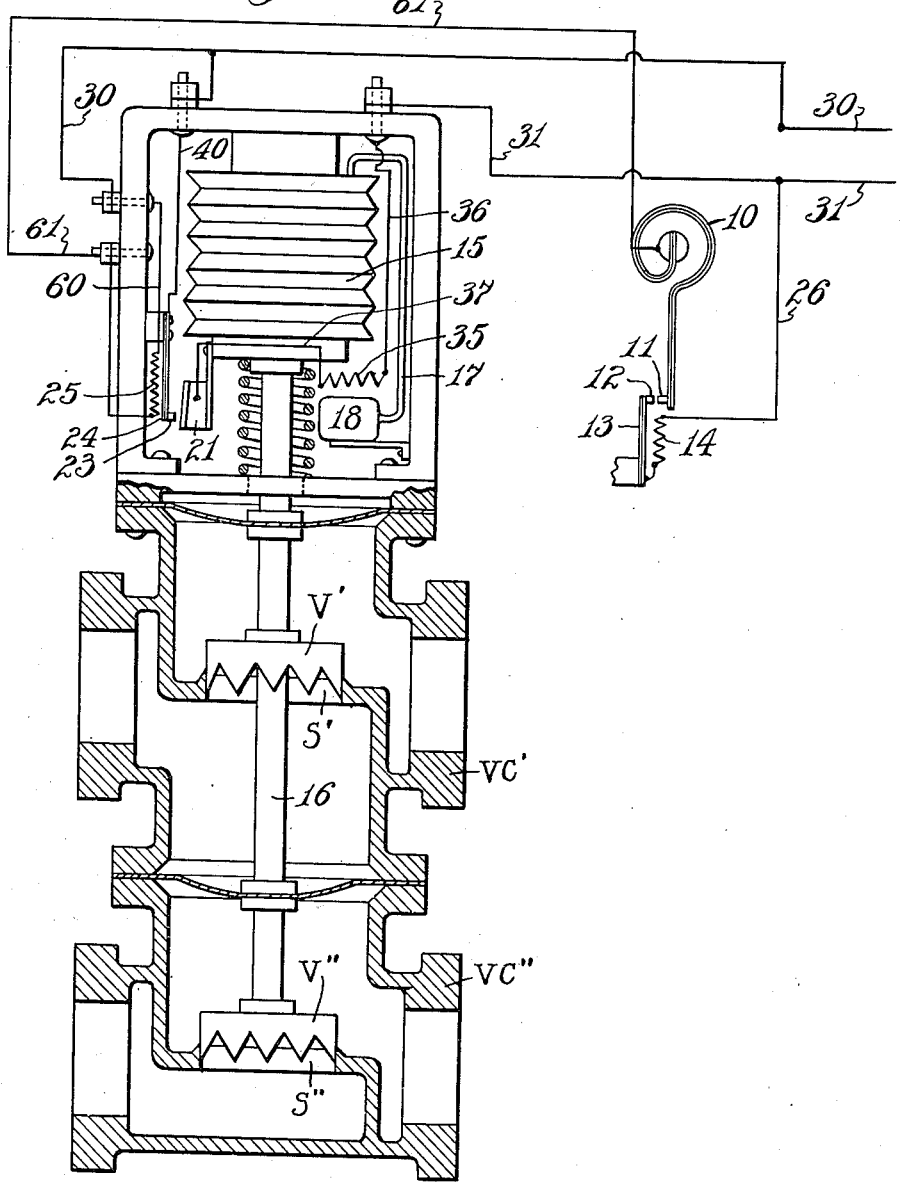
Fig. 3 is a diagram of apparatus capable of proportionately modulating the rate of flow of two liquids in accordance with the temperature conditions at a remote point.

The arrangement shown in Fig. 3 is substantially the same as that shown in Fig. 2, except that an additional valve and valve casing is provided and the valve elements are slightly modified in form.

Here the element 16 carries two valve elements V' and V" which coact respectively with seats S' and S" of the valve casings VC' and VC".

The valves V' and V" are manipulated synchronously by the motor bellows 15 and they are so formed that their adjustments relative to their seats will permit a desired rate of flow so proportioned volumetrically as to each other as to attain the desired proportioning results upon the fluid passing through the valve casings.

The fundamental combination characterizing the several disclosed species of the invention comprises two thermostatic means, (the blades 13 and 24), two simultaneously-responsive heating means for individually heating the thermostatic means (the heater coils 14 and 25) a third element responsive to local conditions (blade 10) means by which the heating means may be intermittently heated, the effectiveness of said heating means being controlled by the coaction of one of the two first-mentioned thermostatic means and the third element, and a power-delivery (plunger 16) capable of being actuated by means (bellows 15, capsule 18, heater 35), controlled by the coaction of an element carried by the other of said thermostatic means (terminal 23) and an element positioned by the actuating means (terminal 21). In the species shown in Fig. 1 the element 16 controls means by which the flow of electric fluid to the heater 7 is determined which, in turn, affects the positioning of the third thermostatic element, whereas in the species shown in Figs. 2 and 3, the element 16 determines the positioning of valves which modulate fluid flow.

Figure 4:
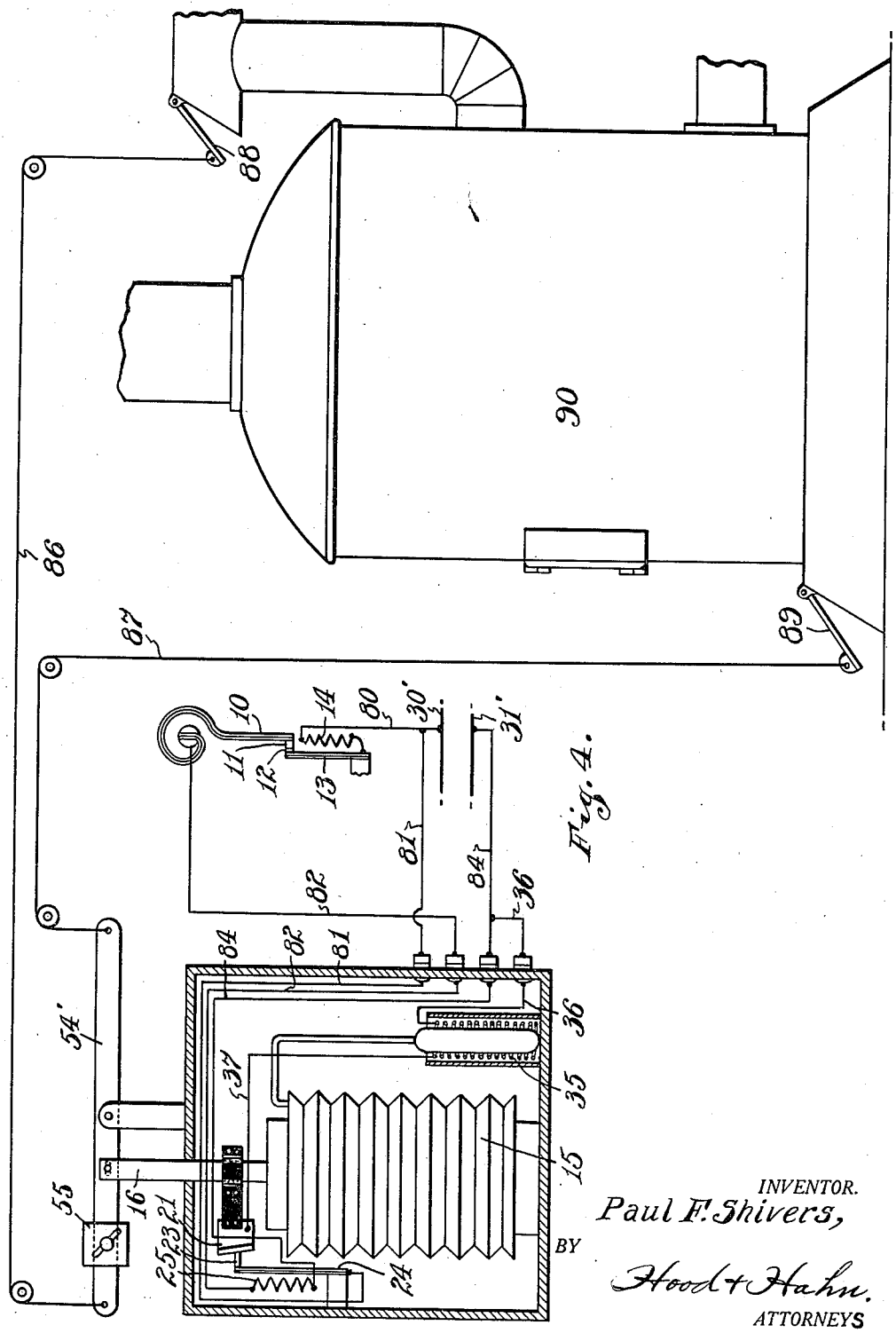
Fig. 4 is a diagram illustrating an application of my improved control device for modulating the positions of the draft and check dampers of a warm air furnace.

In Fig. 4 the fundamental elements are substantially the same as those in the preceding structures and are designated by the same reference numerals. In this construction, however, the wiring is slightly different. Line 30' is connected by a wire 80 with one end of coil 14 and by a wire 81 with blade 24. The opposite end of coil 14 is connected to terminal 12 through blade 13. Wire 82 connects terminal 11, through blade 10, with one end of coil 25 and the other end is connected by wire 84 with line wire 31'.

One end of coil 35 is connected by wire 37 with terminal 21 and the other end of said coil is connected by wire 36 with line wire 31 through wire 84.

The power delivery element 16 is connected with a lever 54' provided with an adjustable counterweight 55 and this lever is connected, at its opposite ends, by cables 86 and 87 respectively, with the check damper 88 and the draft damper 89 of a warm air furnace 90.

As in the previously described constructions, the coaction between terminals 11 and 12 will result in a modulated positioning of terminal 23 in accordance with the position to which terminal 11 is being urged by blade 10 under the influence of the temperature of its ambient medium, and the coaction between terminals 23 and 21 will result in the correspondingly modulated positioning of the power delivery element 54' which, in turn, produces a correspondingly modulated positioning of the draft damper 89 and check damper 88.

At the present time the draft and check dampers of warm air furnaces are commonly controlled by a motor mechanism, either electric or spring, having two defined at-rest positions, which position the draft and check dampers at one or the other of their extremes of motion so that the draft damper is either wide open or fully closed and the check damper is correspondingly either fully closed or wide open.

In the present construction the damper motive mechanism is such that the dampers may be maintained in desired intermediate positions or at their extremes, depending entirely upon the position to which terminal 11 is being ultimately urged by reason of the current temperature of the ambient medium of the thermostat 10.

It will be readily understood that the element 10, in many installations, need not be a thermostatic element but may be a circuit-controlling element responsive to local conditions and coacting with element 13 to control the heating of elements 13 and 24.

Terminal 21 is made of such length that its lower end will be shifted clear of terminal 23 before bellows 15 passes a safe limit of expansion so that capsule 18 can never be heated by coil 35 enough to cause rupture of the bellows.

I claim as my invention:

1. The combination of a thermostatic element, a heater by which said element may be locally heated, a second thermostatic element, a heater by which the second thermostatic element may be locally heated, a heat source for energizing said heaters, a third element responsive to local conditions coacting with the first-mentioned thermostatic element to intermittently connect the heat source with the heaters depending upon the responsive positions of the first and third elements, a power delivery element, means for shifting said power delivery element in opposite directions, and means comprising an element positioned by the power delivery element and an element positioned by the second-mentioned thermostatic element for controlling the application of said shifting means to the power delivery element.

2. The combination of a thermostatic element, an electric heater therefor, a second thermostatic element, an electric heater therefor, a source of energy for said heaters, a third element responsive to local conditions, means carried respectively by the first and third elements for controlling the connection between said heaters and the energy source therefor, a power delivery element, means for applying force thereto to cause the same to shift in either of two directions, and means comprising an element positioned by the power delivery element and an element positioned by the second thermostatic element for controlling the application of force to said power delivery element.

3. The combination of a thermostatic element, an electric heater therefor, a second thermostatic element, an electric heater therefor, a source of energy for said heaters, a third element responsive to local conditions, means carried respectively by the first and third elements for controlling the connection between said heaters and the energy source therefor, a power delivery element, an expansible and contractible element for actuating said power delivery element in either of two directions, temperature-responsive fluid affecting said expansible and contractible element, an electric heater by which a portion of said fluid may be heated, and an energizing circuit for said last-mentioned heater, said energizing circuit comprising a terminal positioned by the expansible and contractible element and a cooperating terminal positioned by the second-mentioned thermostatic element.

4. Apparatus having the characteristics specified in claim 1 and comprising an electric heater arranged to effect positioning of the said third element, an energizing circuit for said last-mentioned heater including a rheostat for controlling the rate of power delivery thereto, and a connection between the movable element of said rheostat and the power delivery element.

5. Apparatus having the characteristics specified in claim 1 and comprising a heater arranged to effect positioning of the third element, an energizer for said last-mentioned heater, and means for controlling the application of said energizer to said heater, said means comprising an element positioned by the power delivery element and a coacting element positioned by the second thermostatic element.

6. Apparatus having the characteristics specified in claim 2 and comprising an electric heater arranged to effect positioning of the said third element, an energizing circuit for said last-mentioned heater including a rheostat for controlling the rate of power delivery thereto, and a connection between the movable element of said rheostat and the power delivery element.

7. Apparatus having the characteristics specified in claim 2 and comprising a heater arranged to effect positioning of the said third element, an energizer for said last-mentioned heater, and means for controlling the application of said energizer to said heater, said means comprising an element positioned by the power delivery element and a coacting element positioned by the second thermostatic element.

8. Apparatus having the characteristics specified in claim 3 and comprising an electric heater arranged to effect positioning of the said third element, an energizing circuit for said last-mentioned heater including a rheostat for controlling the rate of power delivery thereto, and a connection between the movable element of said rheostat and the power delivery element.

9. Apparatus having the characteristics specified in claim 3 and comprising a heater arranged to effect positioning of the said third element, an energizer for said last-mentioned heater, and means for controlling the application of said energizer to said heater, said means comprising an element positioned by the power delivery element and a coacting element positioned by the second thermostatic element.

10. Apparatus having the characteristics specified in claim 1 and comprising a flow-controlling valve, the movable element of which is connected to the power delivery element.

11. Apparatus having the characteristics specified in claim 2 and comprising a flow-controlling valve, the movable element of which is connected to the power delivery element.

12. Apparatus having the characteristics specified in claim 3 and comprising a flow-controlling valve, the movable element of which is connected to the power delivery element.

13. Apparatus of the character specified in claim 1 and comprising two valves, the movable elements of which are connected to said power delivery element.

14. Apparatus of the character specified in claim 2 and comprising two valves, the movable elements of which are connected to said power delivery element.

15. Apparatus of the character specified in claim 3 and comprising two valves, the movable elements of which are connected to said power delivery element.

16. Apparatus having the characteristics specified in claim 1 and comprising a fuel burning heater, means for controlling the combustion of fuel in said heater and connections between said control means and the power delivery element for modulating the position of said control means between its limits.

17. Apparatus having the characteristics specified in claim 2 and comprising a fuel burning heater, means for controlling the combustion of fuel in said heater and connections between said control means and the power delivery element for modulating the position of said control means between its limits.

18. Apparatus having the characteristics specified in claim 3 and comprising a fuel burning heater, means for controlling the combustion of fuel in said heater and connections between said control means and the power delivery element for modulating the position of said control means between its limits.

19. Apparatus of the character specified in claim 1 and comprising a heating furnace having draft and check dampers, and connections between said draft and check dampers and the power delivery element for simultaneously modulating in opposite directions the positions of said draft and check dampers between their limits of movement.

20. The combination of a thermostatic element, a heater by which said element may be heated, a second thermostatic element, a heater by which said second thermostatic element may be locally heated, a heat source for energizing said heaters, a third element responsive to local conditions coacting with the first thermostatic element to intermittently connect the heat source with the heaters depending upon the responsive positions of the first and third elements, an expansible bellows, a thermally responsive medium in said bellows, an electric heater coordinated with said thermally responsive medium, and an energizing circuit for said heater comprising coacting terminals carried respectively by the second thermostatic element and the bellows and so proportioned as to definitely break the heater circuit when the bellows is expanded to a predetermined extent.

21. In combination, a bellows, a capsule containing heat-responsive fluid communicating with the interior of said bellows, an electric heating element associated with said capsule, a circuit for energizing said heating element, and a switch in said circuit, said switch including a thermo-responsive arm, a terminal carried by said arm, a second terminal associated with said bellows, a second electric circuit, a heater in said last-mentioned circuit and arranged to affect said arm, said arm being movable, when heated, to establish said energizing circuit, and said second terminal being movable, upon expansion of said bellows, to break said energizing circuit, and means for controlling said second-mentioned circuit.

22. In combination, a bellows, a capsule containing heat-responsive fluid communicating with the interior of said bellows, an electric heating element associated with said capsule, a circuit for energizing said heating element, and a switch in said circuit, said switch including a thermo-responsive arm, a terminal carried by said arm, a second terminal associated with said bellows, a second electric circuit, a heater in said last-mentioned circuit and arranged to affect said arm, said arm being movable, when heated, to establish said energizing circuit, and said second terminal being movable, upon expansion of said bellows, to break said energizing circuit, and means for controlling said second-mentioned circuit, said last-mentioned means comprising a second thermostatic arm and an element responsive to local conditions, terminals carried by said last-mentioned arm and by said element and connected in said last-mentioned circuit, and a third heater connected in said last-mentioned circuit and associated with said last-mentioned arm, said heater tending, when energized, to move said arm to break said last-mentioned circuit.

23. In combination, a bellows, a capsule containing heat-responsive fluid communicating with the interior of said bellows, an electric heating element associated with said capsule, a circuit for energizing said heating element, and a switch in said circuit, said switch including a movable arm, a terminal carried by said arm, a second terminal associated with said bellows, a second electric circuit, an actuator connected in said second circuit and arranged, when energized, to move said arm to establish said energizing circuit, said second terminal being movable, upon expansion of said bellows, to break said energizing circuit, and means responsive to variations in physical conditions at a predetermined point for controlling said second circuit.

24. In combination, a bellows, a capsule containing heat-responsive fluid communicating with the interior of said bellows, an electric heating element associated with said capsule, a circuit for energizing said heating element, and a switch in said circuit, said switch including a movable arm, a terminal carried by said arm, a second terminal associated with said bellows, a second electric circuit, an actuator connected in said second circuit and arranged, when energized, to move said arm to establish said energizing circuit, said second terminal being movable, upon expansion of said bellows, to break said energizing circuit, and means for controlling said second circuit, said last-mentioned means comprising an element movable in response to local conditions, a terminal carried thereby, a movable member, a terminal carried thereby, said last-mentioned terminals being cooperatively arranged and connected in said last-mentioned circuit, an electric actuator connected in said last-mentioned circuit, and operable, when energized, to shift said member to break said last-mentioned circuit.

25. The combination of an element, an actuator therefor, a second element, a second actuator for said second element, a power source for energizing said actuators, a member responsive to local conditions co-acting with said first element, to intermittently connect said power source with said actuators depending upon the responsive positions of said first element and said member, a motor, means for energizing said motor including an electric circuit comprising co-acting terminals carried respectively by said second element and a member shiftable by said motor, said terminals being so proportioned and arranged as to definitely break said circuit upon actuation of said motor in one direction to a predetermined extent.

26. The combination of an element, an actuator therefor, a second element, a second actuator for said second element, a power source for energizing said actuators, a member responsive to local conditions co-acting with said first element to intermittently connect the power source with the actuators depending upon the responsive positions of said first element and said member, a power delivery element, a reversible motor operatively connected thereto, and means comprising an element positioned by said power delivery element and an element positioned by the second element for controlling said motor.

27. The combination of, a thermally-responsive element, an electric terminal variably positioned thereby, a second thermally-responsive means, an electric terminal variably positioned thereby within cooperative range of the first-mentioned terminal, an electric heater for said first-mentioned thermally-responsive element, an energizing circuit for said heater controlled by said two terminals, electric heating means for said second thermally-responsive means, and an energizing circuit for said last-mentioned heating means including an element responsive to its local conditions for variably affecting the heating effect of said last-mentioned heating means to variably position the second thermally-responsive means in accordance with variations in said local conditions.

28. A modulating system comprising, an electrically energized power delivery element, an electric terminal variably positioned thereby, a thermally-responsive means, an electric terminal variably positioned thereby within cooperative range of the first-mentioned terminal, an electric energizing circuit for said power delivery element including said two terminals, electric heating means for said thermally-responsive means, and an energizing circuit for said heating means including an element responsive to variations in a physical condition at a predetermined point for variably affecting the heating effect of said heating means to variably position the thermally-responsive means in accordance with variations in said physical condition.

29. In combination, a bellows, a capsule containing heat-responsive fluid communicating with the interior of said bellows, an electric heating element associated with said capsule, a circuit for energizing said heating element, and a switch in said circuit, said switch including a movable arm, a terminal carried by said arm, a second terminal associated with said bellows, a second electric circuit, an actuator connected in said second circuit and arranged, when energized, to move said arm to establish said energizing circuit, said second terminal being movable, upon expansion of said bellows, to break said energizing circuit, and means responsive to variations in physical conditions at a predetermined point for variably energizing said second circuit in accordance with variations in said physical condition.

PAUL F. SHIVERS.